United States Patent
Dercks

(10) Patent No.: US 8,752,697 B2
(45) Date of Patent: Jun. 17, 2014

(54) ADJUSTING DEVICE FOR USE ON A CONVEYOR

(75) Inventor: Michael Dercks, Kranenburg (DE)

(73) Assignee: KHS GmbH, Dortmund (DE)

( * ) Notice: Subject to any disclaimer, the term of this patent is extended or adjusted under 35 U.S.C. 154(b) by 252 days.

(21) Appl. No.: 13/125,118

(22) PCT Filed: Jan. 22, 2010

(86) PCT No.: PCT/EP2010/000377
§ 371 (c)(1),
(2), (4) Date: Apr. 20, 2011

(87) PCT Pub. No.: WO2010/091776
PCT Pub. Date: Aug. 19, 2010

(65) Prior Publication Data
US 2011/0203907 A1    Aug. 25, 2011

(30) Foreign Application Priority Data

Feb. 10, 2009 (DE) .......................... 10 2009 008 279
Jun. 15, 2009 (DE) .......................... 10 2009 025 308

(51) Int. Cl.
*B65G 21/20* (2006.01)

(52) U.S. Cl.
USPC ................... 198/836.1; 198/836.3; 198/837; 198/454

(58) Field of Classification Search
USPC ............................. 198/837, 454, 836.1, 836.3
See application file for complete search history.

(56) References Cited

U.S. PATENT DOCUMENTS

| | | | |
|---|---|---|---|
| 3,554,353 A | | 1/1971 | Raudat |
| 4,674,238 A | * | 6/1987 | Suzuki et al. .................. 451/81 |
| 4,923,571 A | * | 5/1990 | Kronseder .................... 198/454 |
| 5,211,280 A | * | 5/1993 | Houde ....................... 198/836.3 |
| 5,407,059 A | * | 4/1995 | Fochler ..................... 198/626.5 |
| 6,209,707 B1 | * | 4/2001 | Ronchi ....................... 198/445 |
| 6,360,880 B1 | * | 3/2002 | Ouellette ................... 198/836.1 |
| 6,390,282 B1 | * | 5/2002 | Ouellette ................... 198/626.5 |
| 7,207,428 B2 | * | 4/2007 | Huttner ........................ 198/444 |
| 7,721,876 B2 | * | 5/2010 | Hartness et al. ........... 198/836.3 |
| 2008/0099311 A1 | * | 5/2008 | Hartness et al. ........... 198/836.3 |
| 2008/0156621 A1 | * | 7/2008 | Lundberg ................... 198/836.3 |

FOREIGN PATENT DOCUMENTS

| | | | | |
|---|---|---|---|---|
| DE | 8812695 | * | 12/1988 | ............. B65B 35/30 |
| DE | 19610936 | | 9/1996 | |
| DE | 19618373 | | 5/1997 | |
| DE | 19931742 | | 1/2001 | |
| WO | 2005/118437 | | 12/2005 | |

* cited by examiner

*Primary Examiner* — Ramya Burgess
*Assistant Examiner* — Thomas Randazzo
(74) *Attorney, Agent, or Firm* — Occhiuti & Rohlicek LLP

(57) ABSTRACT

The invention relates to an adjusting device for use on a conveyor for transporting packages in a transport direction, comprising at least one transport element forming a transport surface for the packages and further comprising functional elements that can be adjusted in an axial direction transversely with respect to the transport direction, having at least one spindle assembly with at least two spindles, the axes of which are oriented parallel to each other and transversely with respect to the transport direction, having at least two dividing or adjusting elements, each of which engages in a threaded spindle by means of a threaded hole.

24 Claims, 5 Drawing Sheets

ADJUSTING DEVICE FOR USE ON A CONVEYOR

CROSS-REFERENCE TO RELATED APPLICATIONS

This application is the National Stage of International Application No. PCT/EP2010/000377, filed on Jan. 22, 2010, which claims the priority of German Patent Application No. 10 2009 025 308.4, filed on Jun. 15, 2009 and German Patent Application No. 10 2009 008 279.4, filed on Feb. 10, 2009. The contents of the applications are hereby incorporated by reference in their entirety.

The invention relates to an adjusting device according to the preamble of Claim 1.

An adjusting device is known (DE 196 18 373 C1) by way of which the location or position of guide elements, which define in a lateral manner a plurality of channels that extend in the conveying direction on a conveying plane formed by rotating conveyor belts, can be modified perpendicular to the conveying direction in order, in this manner, to adapt the width of the channels to the size of the products or packages conveyed on the conveying plane in the channels. The known adjusting device essentially comprises four threaded spindles, forming one spindle arrangement, and a plurality of dividing or adjusting elements, which engage in each case by way of an internal threaded piece (adjusting nut) in the thread of one of the threaded spindles and are guided on a tubular housing that surrounds the spindle arrangement and extends in the adjusting direction. Each internal threaded piece is connected to an external guide piece of the relevant dividing or adjusting element guided on the housing by means of a feather key that is guided through a slot in the housing. One disadvantage, among others, is a relatively costly and time-consuming structure and also the danger of the dividing or adjusting elements or their guide pieces becoming jammed on the hollow-tube-like housing that serves as a guide means.

It is the object of the invention to provide an adjusting device that avoids the aforementioned disadvantages and, with a simplified structure, makes possible an adjustment where there is no danger of the dividing or adjusting elements becoming jammed.

This object is achieved with an adjusting device corresponding to Claim 1.

Further developments of the invention are the object of the sub claims.

The invention is explained below by way of the Figures of exemplary embodiments, in which, in detail:

Figure 1:
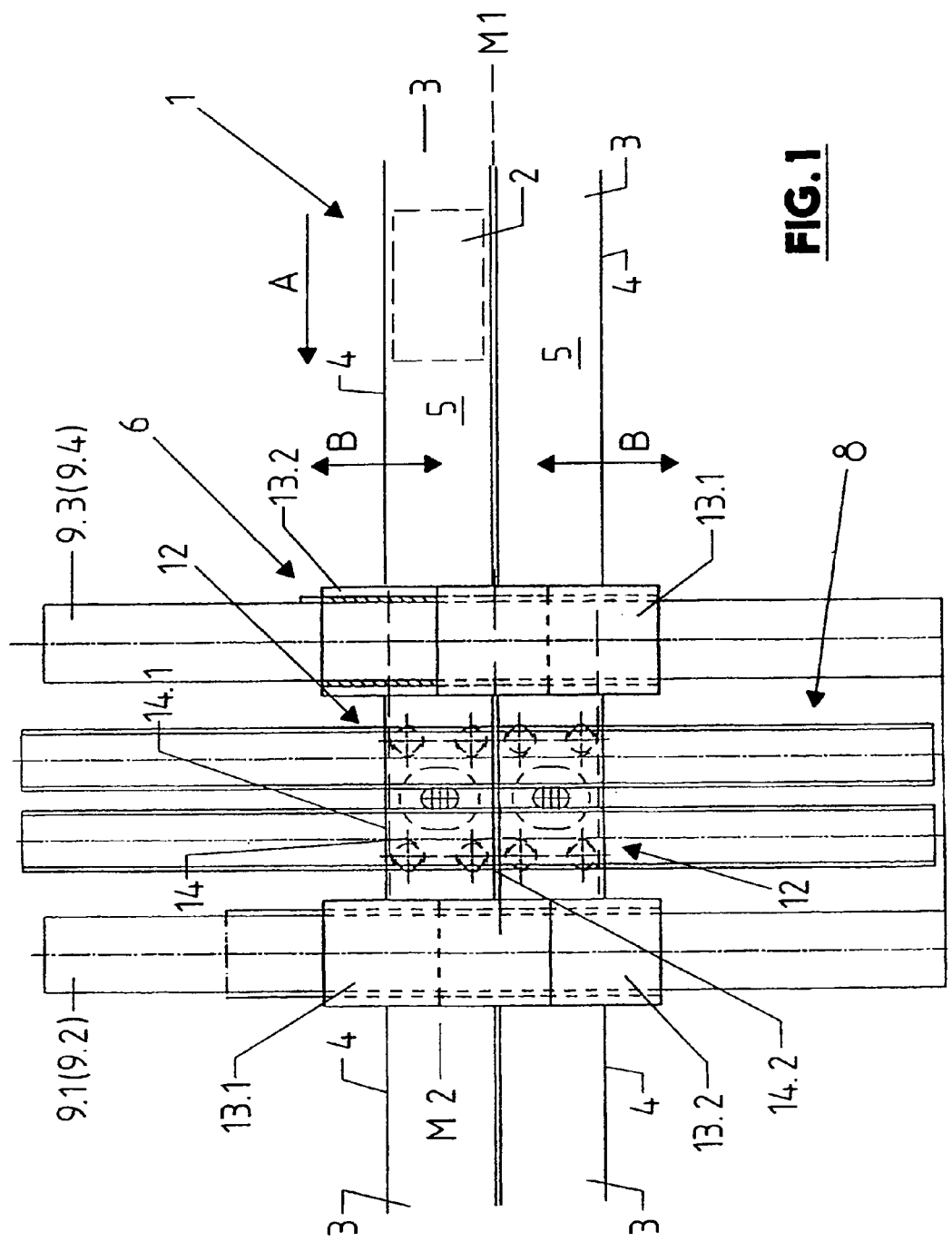
FIG. 1 shows a simplified partial representation of a top view of a conveyor for conveying objects or packages, preferably for conveying objects or packages within a packing machine, together with an adjusting device for laterally adjusting guide elements of the conveyor.
Figure 2:
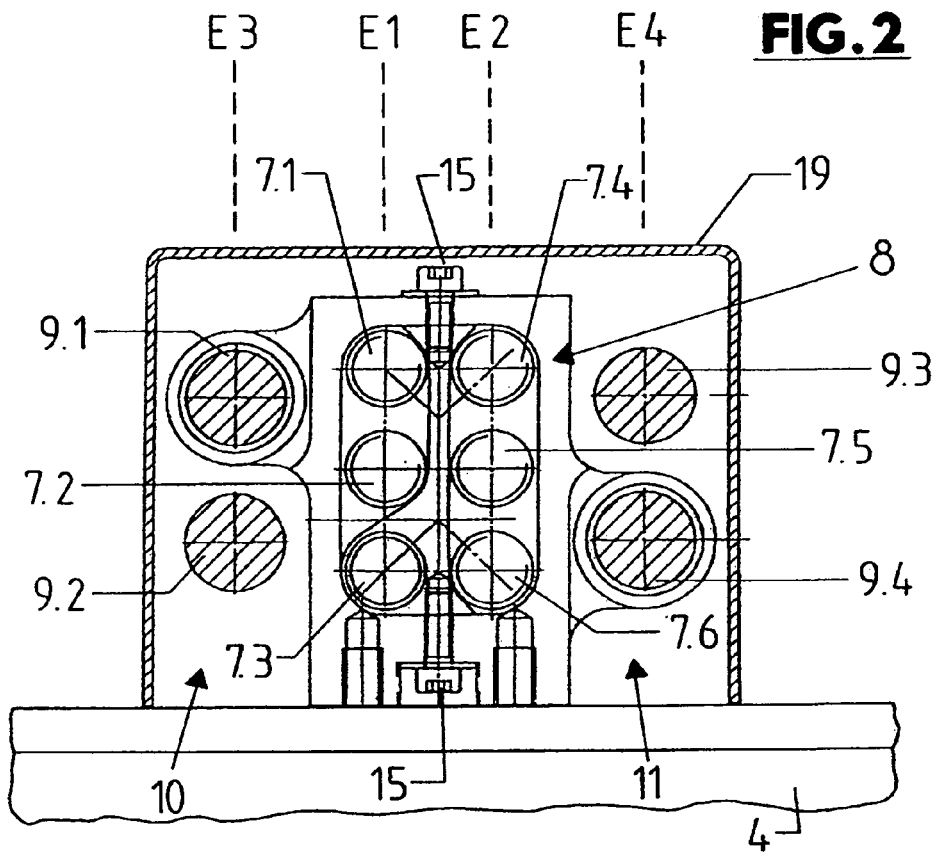
FIG. 2 shows a side view of one of the dividing or adjusting elements of the adjusting device in FIG. 1.

The conveyor, given the general reference 1 in the Figures, is used for conveying objects or packages 2 in a conveying direction shown in FIG. 1 by the arrow A. The packages 2 are, for example, bottles or other containers or soft packages or sets produced from individual packages, etc. In the embodiment represented, the conveyor 1 consists, for this purpose, of a plurality of conveyor belts (e.g. belt conveyors or slat-band chain conveyors), each forming a closed loop and being driven in an endlessly rotating manner, connecting together transversely in the conveying direction A and forming by way of their top loop lengths a horizontal or substantially horizontal conveying surface for the packages 2. To make the representation simpler, FIG. 1 only shows two such conveyor belts 3, which form a channel 5 of the conveyor 1 that is defined laterally by two channel-guides 4, in which (channel) the packages 2 are conveyed following one after the other in the conveying direction (A). The conveyor 1 actually has a plurality of such channels 5, which are offset from each other parallel to the conveying plane and perpendicular to the conveying direction, and in each case consist of the conveying plane determined by the conveyor belts and the lateral guides 4 located above the conveying plane. To adapt the width of the channels 5 to the dimensions of the packages 2 in the axial direction transversely to the conveying direction A, the guides 4 are laterally adjustable, as is indicated in FIG. 1 by way of the double arrows B. Said lateral adjustment of the guides 4 of all the channels 5 is provided by adjusting devices 6, which are provided following each other in the conveying direction A, above the conveying plane formed by the conveyor belts 3 and at the same time above the path of movement of the packages 2 on said conveying plane. To make the representation simpler, only one such adjusting device 6 is shown in FIG. 1.

The adjusting device 6, in the embodiment represented, includes a plurality of threaded spindles 7.1-7.6, which, with their axes parallel to each other, are oriented horizontally and perpendicularly to the conveying direction A. The threaded spindles 7.1-7.6 are in each case rotatably mounted at both ends in bearings (not shown) on a machine frame. In addition, the threaded spindles 7.1-7.6 are located in such a manner that they form two groups with, in each case, three threaded spindles 7.1, 7.2, 7.3 or 7.4, 7.5, 7.6, said groups of spindles being located next to each other in the horizontal direction such that the axes of the spindles of each spindle group are located in a common plane E1 or E2, which is oriented perpendicularly to the conveying plane of the conveyor 1. The axis of each spindle of one spindle group is located with the axis of the corresponding spindle of the other spindle group in a common horizontal plane. The spindles 7.1-7.6 or the spindle groups form a spindle arrangement given the general reference 8 in the Figures.

The threaded spindles 7.1-7.6, in the embodiment represented, are also realised such that they are realized on one side of a vertical centre plane M, which encloses the conveying direction and is located perpendicularly to the conveying plane, with a right-handed thread and on the other side of said centre plane M1 in each case with a left-handed thread.

The adjusting device 6 also includes four guide rods 9.1-9.4, which are located in each case with their axes parallel to each other and parallel to the axes of the spindles 7.1-7.6 and consequently in an axial direction perpendicularly to the conveying direction A and parallel to the conveying plane of the conveying system 1. The guide rods 9.1-9.4, which extend over the entire width of the conveying system 1 and in each case are held at both ends on a machine frame (not shown), form two guide rod groups 10 and 11, which in each case include two guide rods 9.1, 9.2 or 9.3, 9.4 and which are located on both sides of the spindle arrangement 8, the guide rod group 10 in the conveying direction A upstream of the spindle arrangement 8 and the guide rod group 11 in the conveying direction A downstream of the spindle arrangement 8. The guide rods 9.1 and 9.2 or 9.3, 9.4 are located one above the other in the guide rod groups 10 and 11 in each case in an axial direction perpendicularly to the conveying plane of the conveyor 1, in such a manner that the axes of the guide rods 9.1, 9.2 of the guide rod group 10 are located in the plane E3 oriented perpendicularly to the conveying plane and the axes of the guide rods 9.3, 9.4 of the guide rod group 11 are located in the plane E4 oriented perpendicularly to the conveying plane of the conveyor 1.

Figure 4:
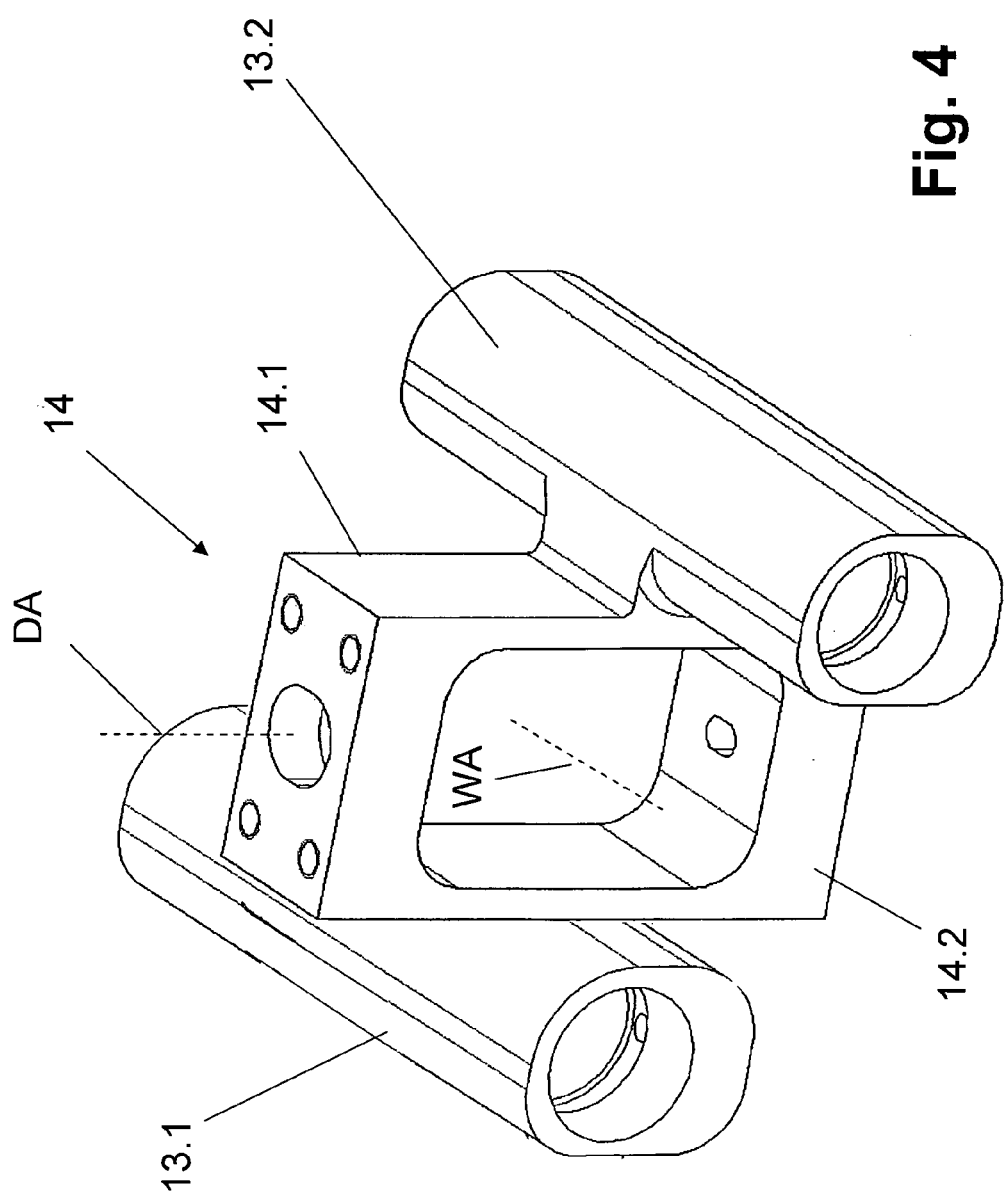
FIGS. 4-6 show in each case perspective representations of different housings for the dividing or adjusting elements to be used on an adjusting device in FIG. 1.

The adjusting device 6 also includes a plurality of dividing or adjusting elements 12, on which in each case one of the guides 4 is held at its upper region, such that it protrudes downward from the relevant dividing or adjusting element 12. The dividing or adjusting elements 12 are displaceably guided on the guide rods 9.1-9.4 for the adjustment (double arrow B) of the guides 4 in the longitudinal direction of the guide rod, in each case by way of two guide sections 13.1 and 13.2, which in each case engage round one of the guide rods 9.1-9.4 and are provided on a frame-like housing 14, protruding to the side of said housing in an ear-like manner. The frame-like housing 14, which is reproduced in FIG. 4 in a perspective component drawing, is open at its two end faces 14.1 and 14.2 which are offset in the axial direction of the axes of the spindles 7.1-7.6 and of the guide rods 9.1-9.4 and are oriented in planes perpendicularly to said axes.

The dividing and adjusting elements 12 are in each case realized in a mirror-symmetrical manner to a centre plane M2 that is located parallel to the end faces 14.1 and 14.2 of the housing 14. The two guide portions 13.1 and 13.2 are realized such that in each case they protrude beyond both end faces 14.1 and 14.2 of the housing 14 with an axial length, which (axial length) is identical to or somewhat smaller than the distance between the two end faces 14.1 and 14.2. In addition, the guide portions 13.1 and 13.2 on the two longitudinal sides of the frame-like housing 14 are provided at different heights such that where dividing or adjusting elements 12 follow one after another in the adjusting direction B, one dividing or adjusting element, by way of its guide portion 13.1, engages around the guide rod 9.1 and by way of its other guide portion 13.2 engages around the guide rod 9.4 and the dividing or adjusting element 12 following said dividing or adjusting element 12 in the adjusting direction B, by way of its guide portion 13.1 engages around the guide rod 9.3 and by way of the guide portion 13.2 engages around the guide rod 9.2. All the dividing or adjusting elements 12, in this case, are, however, realized in an identical manner. They are simply provided on the guide rods 9.1-9.4 alternately rotated by 180° about a vertical axis or a substantially vertical axis DA (FIG. 4) in the embodiment represented.

The use of two guide portions 13.1 and 13.2 for the guiding of each dividing and adjusting element 12 and the relatively large axial length of said guide portions ensure reliable guiding of the dividing or adjusting elements 12 that is, in particular, also secured against jamming. Through the interconnected arrangement of the guide portions 13.1 and 13.2 on the respective housing 14, i.e. through the different height position of the guide portions 13.1 and 13.2 and through the arrangement, rotated alternately by 180° about the axis DA, of the dividing or adjusting elements 12 on the guide rods 9.1-9.4, it is possible to adjust the dividing or adjusting elements 12 whereby adjacent dividing or adjusting elements 12 connect together tightly by way of their housing 14 in order, in this way, to achieve a minimum width for the respective channel 5.

Figure 3:
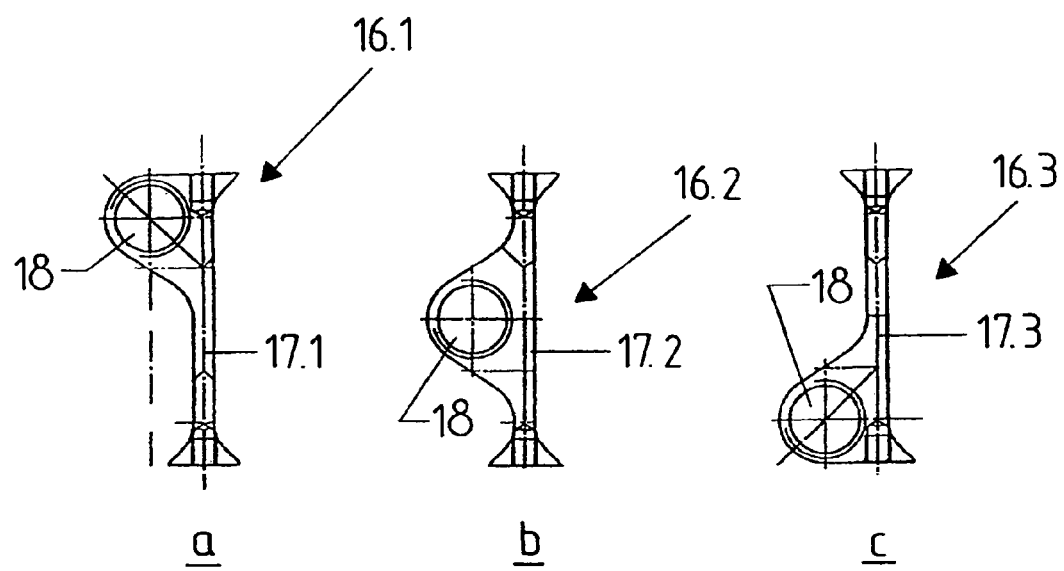
FIG. 3 shows a side view and component drawing of different adjusting nuts to be used with dividing or adjusting elements corresponding to FIG. 2.

An adjusting nut is held in the housing 14 of each dividing or adjusting element 12 with the aid of locking screws 15, three different adjusting nuts 17.1-17.3 in the positions a-c being shown in FIG. 3. The adjusting nuts in each case comprise an adjusting nut body 17.1-17.3 with a threaded bore 18 and are each provided in two different designs, which simply differ from each other in that in one embodiment of the adjusting nuts 16.1-16.3 the thread of the threaded bore 18 is a right-handed thread and in the other design of the adjusting nuts 16.1-16.3 the thread of the threaded bore 18 is a left-handed thread.

The adjusting nuts 17.1-17.6 are realized in a substantially strip-like manner with a projection that includes the respective threaded bore 18 in such a manner that only one of the spindles 7.1-7.6 extends through the threaded bore 18 of the respective adjusting nut 16.1-16.4 attached to a housing 14 of a dividing or adjustment element 12, whereas the remaining spindles extend through the relevant housing 14 or through the relevant dividing or adjusting element 12 without engaging in the threaded bore 18. Thus, for example, in FIG. 1 the adjusting nut 16.1 suitable for the right-handed thread of the threaded spindle 7.1 is provided in the housing 14 of the one of the two dividing or adjusting elements 12 and the corresponding adjusting nut 16.1 suitable for the left-handed thread of the spindle 7.1 is provided in the other of the two dividing or adjusting elements 12. In a reverse manner it is also possible to provide the adjusting nut 16.1 suitable for the right-handed thread of the threaded spindle 7.4 in the one adjustment element or its housing 14 and the adjusting nut 16.1 suitable for the left-handed thread of the spindle 7.4 in the other adjustment element 12.

The adjustment of further dividing or adjusting elements 12 is then effected in each case by means of a further spindle 7.2-7.6, the suitable adjusting nuts 16.1-16.3 for these spindles and their threads being provided in the respective housing 14, for example for the spindles 7.2 and 7.5 the adjusting nuts 16.2 with right-handed or left-handed thread and for the spindles 7.3 and 7.6 the adjusting nuts with left-handed and right-handed thread, etc.

By using six spindles 7.1-7.6, a total of six pairs of dividing or adjusting elements 12 and the guides 4 held on said elements are consequently adjustable individually by rotating the spindles 7.1-7.6, in such a manner that during said adjustment process, the associated dividing or adjusting elements 12 of each pair are moved in a mirror-symmetrical manner relative to the centre plane M1 of the conveying system 1, such that with a total of six spindles 7.1-7.6 a total of eleven channels 5 with individually adjustable widths are possible for the conveying system 1.

In principle, it is possible to realize the adjusting device 6 such that the individual spindles 7.1-7.6 can be actuated in a motor-driven or manual manner independently of each other. However, the spindles are preferably interconnected in a driving manner via a transmission arrangement such that by means of one single manual or motor-driven drive all the spindles 7.1-7.6 are actuated for an adjustment of all the dividing or adjusting elements 12.

It has been mentioned above that a plurality of adjustment devices 6 are provided offset from each other in the conveying direction A. In particular, if the spindles 7.1-7.6 of each adjusting device 6 are interconnected in a driving manner in each case by means of a transmission arrangement, it is possible to provide the means for the manual and/or motor-driven adjustments or actuation of the spindles 7.1-7.6 on one adjusting device 6 and then to connect the remaining adjusting devices in a driving manner to said one adjusting device.

The reference 19 is given to a hub-like cover, which covers the housing 14 and the guide portions 13.1-13.4 of the respective dividing or adjusting element on the top side and on the two sides that extend in the adjusting direction B.

Figure 5:
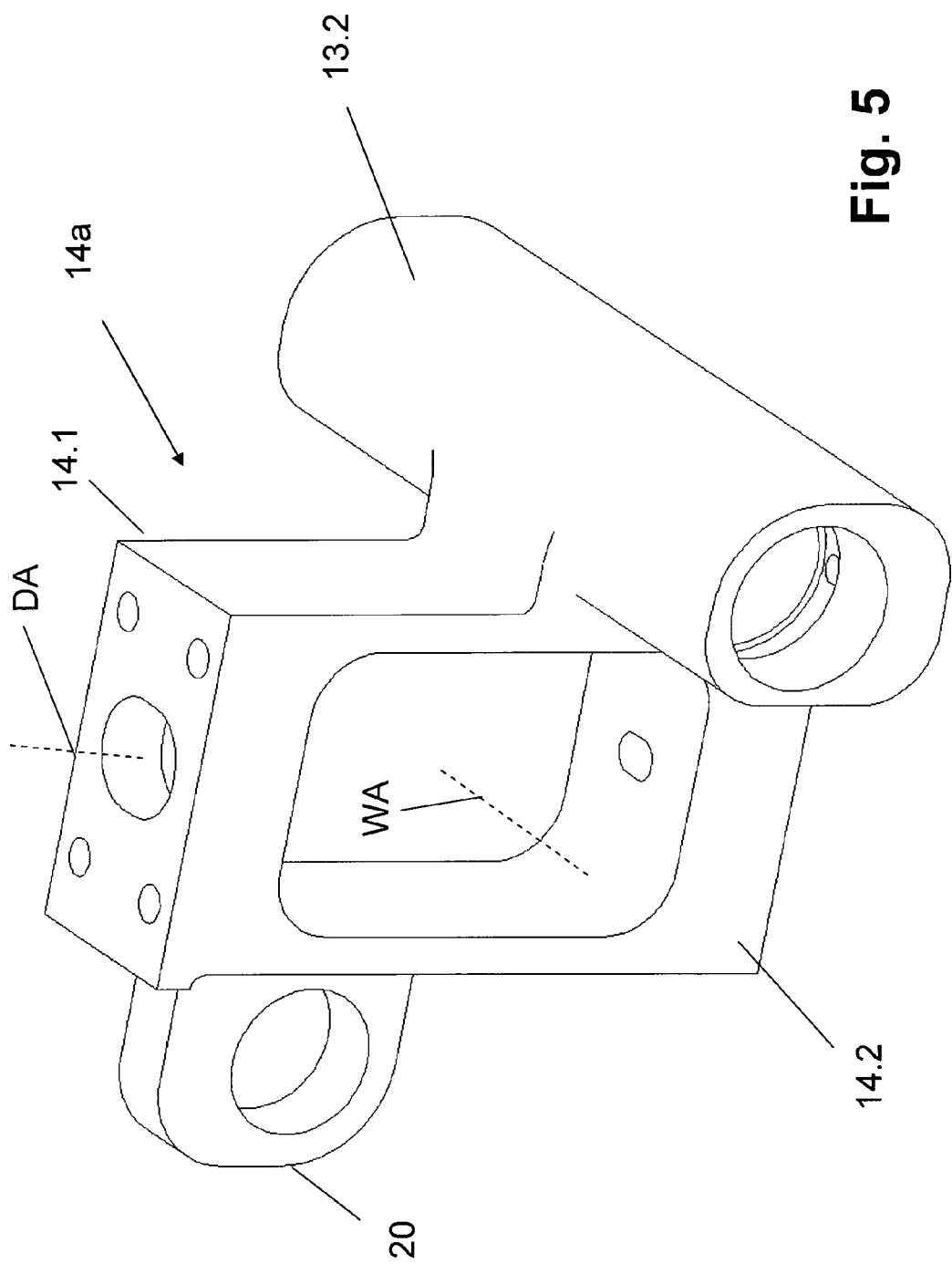

FIG. 5 shows, as a further embodiment, a frame-like housing 14a, which, in place of the housing 14, can be used together with the respective adjusting nut 16.1-16.3 mounted in the housing 14a as a dividing or adjusting element 12 for the conveyor 1 or for one of the adjusting devices 6 at that location. The housing 14a differs from the housing 14 essentially only in that only one guide portion is provided on said housing, namely the guide portion 13.2, said guide portion, in an installed position that corresponds to the representation in FIG. 5, interacting with the lower guide rod 9.4. On the other side of the frame-like housing 14a remote from the guide portion 13.2, an axially shortened sleeve-like portion 20 is integrally formed in place of the guide portion 13.1, the axial length of which portion is, for example, at the most identical to or smaller than the distance between the housing end faces 14.1 and 14.2 and the installation position corresponding to the representation in FIG. 5 for the anti-rotation protection of the housing 14a and consequently of the dividing or adjusting element 12 formed by said housing is guided at the upper guide rod 9.1. In order to obtain reliable guiding for the dividing and adjusting element 12 formed by the housing 14a, in spite of only one single guide portion 13.2 actually serving as a guide, the axial length of the guide portion 13.2 is preferably greater in comparison with that of the guide portions 13.2 and 13.2 of the housing 14, i.e. its axial length is at least identical to, but is preferably greater than double the distance between the two housing end faces 14.1 and 14.2.

The housing 14a or the dividing or adjusting element 12 that includes said housing is also installed such that adjacent housings 14a along the guide rods 9.12-9.4 are in each case turned by 180° at least about the axis DA, i.e. the housing 14a of a dividing or adjusting unit 12 in the afore-described installation position is guided by way of its guide portion 13.2 on the guide rod 9.4 and by way of the portion 20 on the guide rod 9.1 and the adjacent dividing or adjusting unit 12 or its housing 14a is guided by way of the guide portion 13.2 on the lower guide rod 9.2 and by way of the portion 20 on the upper guide rod 9.3.

The housing 14a, however, is preferably realized such that the installation of said housing or of the dividing or adjusting element 12 realized in each case by way of the housing, can be effected upside down, i.e. turned by 180° about an axis WA oriented parallel to the guide rods 9.1-9.4, in such a manner that the guide portion 13.2 is optionally guided at the upper guide rod 9.1 or 9.3 and the portion 20 for the anti-rotation protection is optionally guided at the lower guide rod 9.2 or 9.4. This installation makes it possible, for example, in spite of the greater axial length of the respective guide portion 13.2, to be able to connect together tightly, by way of their housings 14a, dividing or adjusting elements 12 that follow one after another in the longitudinal direction of the guide rods in order to enable, in this way, as small a minimum channel width as possible for the channels 5. In addition, with a plurality of adjusting devices 6 following each other in the conveying direction A, an improved channel width adjustment can be achieved through the arrangement of those dividing or adjusting elements 12 or of their housings 14a which are assigned to one and the same guide 4, turned upside down from adjusting device to adjusting device.

In order to make it possible to turn the dividing or adjusting units 12 formed by the housings 14a upside down, i.e. turned in each case by 180° about the axis WA, each housing 14a is provided in each case at its upper and lower side with means that make it possible to secure the guide 4.

Figure 6:
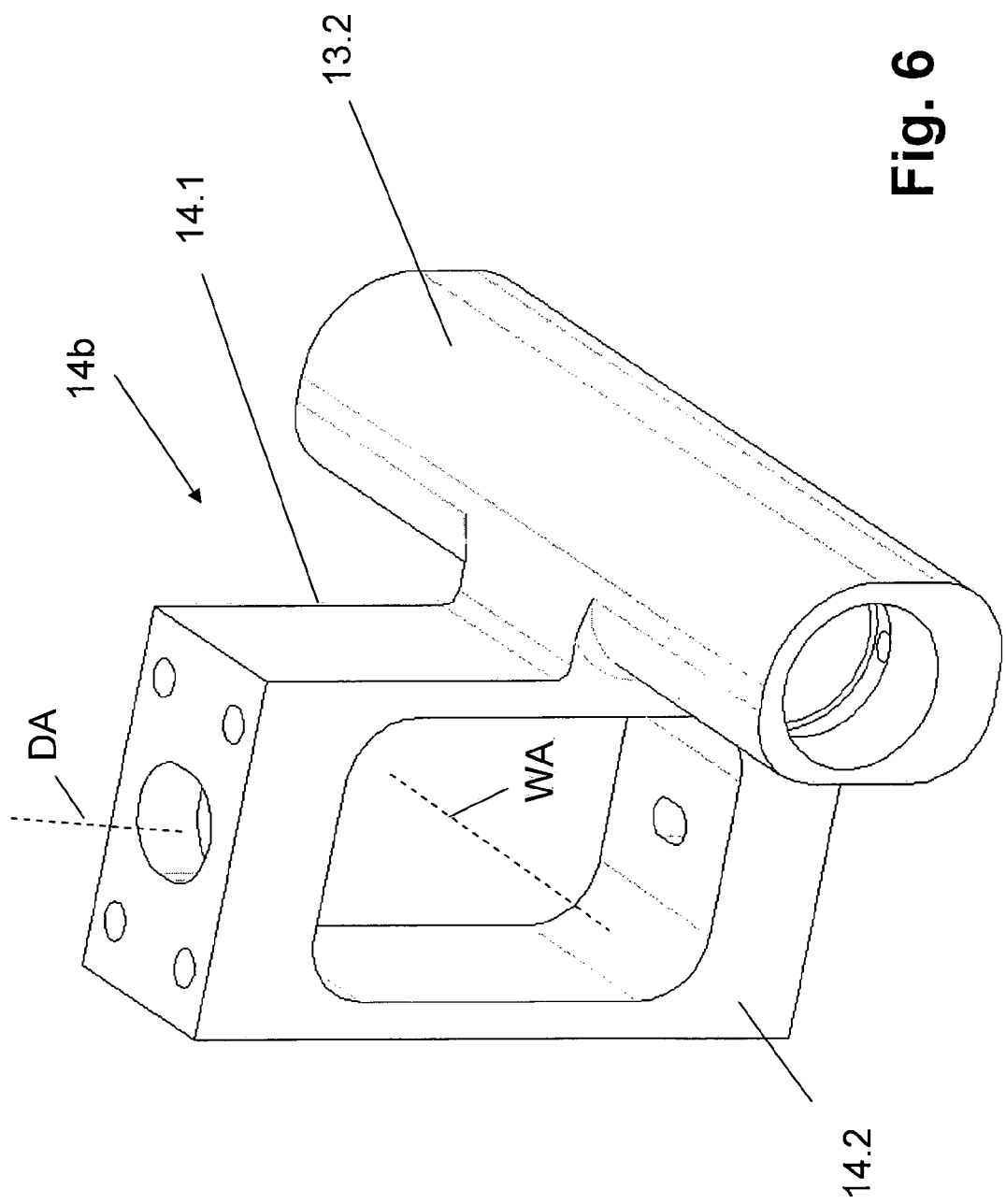

FIG. 6 shows, as a further embodiment, a housing 14b that differs from the housing 14a in that the portion 20 is also omitted and only one guide portion, namely simply the guide portion 13.2, is provided at the housing 14b.

Just as the housing 14a, the housing 14b is also suitable to be installed upside down turned by 180°. The anti-rotation prevention means is effected for the housing 14b, or for the dividing or adjusting elements 12 realized by way of such housings, by the respective threaded spindle 7.1-7.6 interacting with the adjusting nut 16.1-16.3 or also via the respective guide 4 that is held on a plurality of adjusting devices 6 following one after another in the conveying direction A or on dividing or adjusting units 12 formed by housing 14b at that location.

The invention has been described above by way of exemplary embodiments. It is obvious that modifications and conversions are possible without in any way departing from the inventive concept underlying the invention.

Thus, it has been assumed above that the adjusting device 6 is used to adjust the guides 4 that define the channels 5 in a lateral manner. Obviously, the adjusting device 6 can also be used for a lateral adjustment of the conveyor belts 3 or of their guides, i.e. an adjustment oriented perpendicularly to the conveying direction A, to adjust the channel width of such conveyors 1, where the conveying plane of each channel 5 is formed by one or several conveyor belts in such a manner that the channel width is somewhat greater than the width of the conveying surface formed by the at least one conveyor belt.

In addition, it has been assumed above that the spindles 7.1-7.6 are each realized with a right-handed thread and a left-handed thread. In principle it is possible to realize all the spindles 7.1-7.6 in each case continuously with one single type of thread, for example with a right-handed thread, and then for each pair of dividing or adjusting elements 12 to use two spindles 7.1-7.6 that are rotated in opposite directions, for example by means of a transmission during the adjusting process. In the case of this design, where adjusting nuts 16.1-16.3 with only one type of thread are provided at the threaded bores 18, it is possible to adjust three pairs of dividing or adjusting elements 12, this is in spite of a design of the spindles 7.1-7.6 being simplified and right-handed and left-handed threads being avoided.

| List of references | |
|---|---|
| 1 | Conveyor |
| 2 | Package |
| 3 | Conveyor belt |
| 4 | Guide |
| 5 | Channel |
| 6 | Adjusting device |
| 7.1-7.6 | Spindle |
| 8 | Spindle arrangement |
| 9.1-9.4 | Guide rod |
| 10, 11 | Guide rod arrangement |
| 12 | Dividing or adjusting unit |
| 13.1, 13.2 | Guide portion |
| 14, 14a, 14b | Housing |
| 14.1, 14.2 | Housing end face |
| 15 | Locking screw |
| 16.1-16.3 | Adjusting nut |
| 17.1-17.3 | Adjusting nut body |
| 18 | Housing |
| 19 | Cover |
| 20 | Portion |
| M1, M2 | Centre plane |
| E1, E4 | Plane |
| A | Conveying direction |
| B | Adjusting direction |

The invention claimed is:

1. An apparatus for use on a conveyor for conveying packages in a conveying direction, said apparatus comprising: an adjusting device having at least one conveying element that forms a horizontal conveying surface for conveying the packages, guides that are adjustable in an axial direction transversely relative to the conveying direction, at least one spindle arrangement with at least two threaded spindles, the spindles being oriented with their axes parallel to each other and transversely relative to the conveying direction, at least one pair of dividing or adjusting elements, each of which is in engagement with a threaded spindle by way of an internally threaded portion, and each of which has a corresponding one of said guides protruding downward therefrom, and a first guide rod arrangement having a first guide rod for guiding the dividing or adjusting elements in an adjusting direction, the first guide rod being arranged to a side of the spindle arrangement and having a guide-rod axis oriented in the adjusting direction.

2. The apparatus of claim 1, wherein each dividing or adjusting element is guided in the adjusting direction on at least the first guide rod and a second guide rod.

3. The apparatus of claim 1, further comprising a second guide rod arrangement, wherein the first and second guide rod arrangements each have at least two guide rods and wherein the first and second guide rod arrangements are provided on opposite sides of the spindle arrangement.

4. The apparatus of claim 1, further comprising a first guide portion guided on the first guide rod, the first guide portion being provided on the dividing or adjusting elements or on a housing thereof, the first guide portion having an axial length in the direction of the guide-rod axis of the first guide rod.

5. The apparatus of claim 4, further comprising a second guide portion for anti-rotation protection, the second guide portion acting on or guided on a second guide rod and being provided on the dividing or adjusting element or on housings thereof.

6. The apparatus of claim 1, wherein the first guide rod arrangement has at least a second guide rod, and wherein the first and second guide rods are on oppositely situated sides of the spindle arrangement of first and second dividing or adjusting elements following one another in the adjusting direction, wherein the first dividing or adjusting element is guided on the first guide rod and the second dividing or adjusting element, which is adjacent to the first dividing or adjusting element in the adjusting direction, is guided on the second guide rod.

7. The apparatus of claim 1, further comprising: a second guide rod arrangement, wherein the first and second guide rod arrangements each include at least two guide rods, and identically realized dividing or adjusting elements or their housings following one after the other in the longitudinal direction of the guide rods, said dividing or adjusting elements or their housings being guided and/or are rotationally secured on the guide rods, and rotated or turned by 180° about an axis perpendicular to a longitudinal extension of the guide rods and/or about an axis parallel to the longitudinal extension of the guide rods.

8. The apparatus of claim 4, wherein the dividing or adjusting elements or their housing form at least one opening through which threaded spindles that are not in engagement with an internal thread of a corresponding dividing or adjusting element are guided.

9. The apparatus of claim 1, further comprising additional pairs of dividing or adjusting elements, wherein the dividing or adjusting elements of each pair are adjustable independently of each other by rotating the threaded spindles.

10. The apparatus of claim 9, wherein the dividing or adjusting elements of each pair act, by way of their internally threaded portions, on contra-directional threaded portions of one and the same threaded spindle.

11. The apparatus of claim 1, wherein the at least one spindle arrangement comprises has at least four threaded spindles.

12. The apparatus of claim 1, wherein the internally threaded portions of the dividing or adjusting elements comprise an adjusting nut mounted in a housing and a threaded bore.

13. The apparatus of claim 1, further comprising lateral guides and conveying sections or channels, wherein the adjusting device is configured for adjusting the position or location of the lateral guides on the conveying sections or channels.

14. The apparatus of claim 1, wherein the adjusting device is configured for adjusting conveying elements or guides for the conveying elements in a direction transverse to the conveying direction.

15. The apparatus of claim 2, wherein the at least two guide rods comprise guide rods located on both sides of the spindle arrangement.

16. The apparatus of claim 1, wherein the axial length of the first guide portion is greater than a dimension of a housing of a dividing and adjusting element in said axial direction.

17. The apparatus of claim 5, wherein the second guide portion has an axial length that is smaller than the axial length of the first guide portion.

18. The apparatus of claim 9, wherein the dividing or adjusting elements are adjustable by rotating the threaded spindles in opposite directions.

19. The apparatus of claim 9, wherein the dividing or adjusting elements of each pair act, by way of their internally threaded portions, on contra-directional threaded portions of independent threaded spindles.

20. The apparatus of claim 1, wherein the at least one spindle arrangement comprises six threaded spindles.

21. The apparatus of claim 12, wherein at least two adjusting nuts are mounted on housings of the dividing or adjusting elements, the thread or threaded portion of each nut being adapted to engage an associated threaded spindle.

22. The apparatus of claim 1, wherein the first guide rod arrangement has at least a second guide rod, and wherein the first and second guide rods are on a common side of the spindle arrangement of first and second dividing or adjusting elements following one another in the adjusting direction, wherein the first dividing or adjusting element is guided on the first guide rod and the second dividing or adjusting element, which is adjacent to the first dividing or adjusting element in the adjusting direction, is guided on the second guide rod.

23. The apparatus of claim 1, further comprising additional pairs of dividing or adjusting elements, wherein the dividing and adjusting elements of each pair are adjustable together by rotating the threaded spindles.

24. An apparatus for use on a conveyor for conveying packages in a first direction, said apparatus comprising an adjusting device, said adjusting device comprising a conveying element, a first guide, a second guide, a spindle arrangement, a first dividing-or-adjusting element, a second dividing-or-adjusting element, and a first guide rod arrangement, wherein said conveying element forms a horizontal conveying surface for conveying said packages, wherein said first guide is adjustable in a second direction, wherein said second guide is adjustable in said second direction, wherein said second direction is perpendicular to said first direction, wherein said spindle arrangement comprises a first threaded spindle having a first-threaded-spindle axis, wherein said spindle arrangement further comprises a second threaded spindle having a second-threaded-spindle-axis, wherein said first-threaded-spindle axis is oriented in a direction that is parallel to said second-threaded-spindle axis, wherein said first-threaded-spindle axis is oriented in a direction that is perpendicular to said first direction, wherein said first dividing-or-adjusting element comprises an internally threaded portion, wherein said first guide protrudes down from said first dividing-or-adjusting element, wherein said second dividing-or-adjusting element comprises an internally threaded portion, wherein said second guide protrudes down from said second dividing-or-adjusting element, wherein said first threaded spindle engages said first dividing-or-adjusting element at said first threaded portion, wherein said second threaded spindle engages said second dividing-or-adjusting element at said second threaded portion, wherein said first guide rod arrangement comprises a first guide rod, wherein said first guide rod guides said first and second dividing-or-adjusting elements in an adjusting direction, wherein said first guide rod is arranged to a side of said spindle arrangement, and wherein said first guide rod has a guide-rod axis oriented in said adjusting direction.

* * * * *